(12) United States Patent
Byrd et al.

(10) Patent No.: US 8,854,325 B2
(45) Date of Patent: Oct. 7, 2014

(54) TWO-FACTOR ROTATION INPUT ON A TOUCHSCREEN DEVICE

(75) Inventors: Thomas Edward Byrd, Wokingham (GB); Julien Camille Paul-Cavallier, London (GB)

(73) Assignee: BlackBerry Limited, Waterloo (CA)

( * ) Notice: Subject to any disclaimer, the term of this patent is extended or adjusted under 35 U.S.C. 154(b) by 203 days.

(21) Appl. No.: 13/408,869

(22) Filed: Feb. 29, 2012

(65) Prior Publication Data

US 2013/0222275 A1    Aug. 29, 2013

(51) Int. Cl.
| | |
|---|---|
| G09G 5/00 | (2006.01) |
| G06F 3/033 | (2013.01) |
| G09G 5/08 | (2006.01) |
| G06F 3/041 | (2006.01) |
| G06K 11/06 | (2006.01) |
| G08C 21/00 | (2006.01) |
| G06F 3/00 | (2006.01) |
| G06F 3/048 | (2013.01) |

(52) U.S. Cl.
USPC ........ 345/173; 345/156; 345/157; 178/18.01; 178/20.01; 715/700; 715/856; 715/863

(58) Field of Classification Search
USPC ................................ 345/156, 157, 173–178; 178/18.01–20.04; 715/700, 856, 863
See application file for complete search history.

(56) References Cited

U.S. PATENT DOCUMENTS

| | | | |
|---|---|---|---|
| 6,757,002 B1 * | 6/2004 | Oross et al. .................. | 715/864 |
| 7,084,859 B1 | 8/2006 | Pryor | |
| 7,302,650 B1 | 11/2007 | Allyn et al. | |
| 2004/0015591 A1 | 1/2004 | Wang | |
| 2009/0079700 A1 | 3/2009 | Abernathy | |
| 2009/0244013 A1 | 10/2009 | Eldershaw | |
| 2009/0303231 A1 | 12/2009 | Robinet et al. | |
| 2010/0015684 A1 | 1/2010 | DeFrees | |
| 2010/0079405 A1 | 4/2010 | Bernstein | |
| 2010/0103117 A1 | 4/2010 | Townsend et al. | |
| 2010/0128002 A1 | 5/2010 | Stacy | |

(Continued)

FOREIGN PATENT DOCUMENTS

EP          1202157 A2     5/2002

OTHER PUBLICATIONS

Extended European Search Report dated Jul. 27, 2012 from EP 12157432.1, 7 pgs.

(Continued)

*Primary Examiner* — Ilana Spar
(74) *Attorney, Agent, or Firm* — Novak Druce Connolly Bove + Quigg LLP

(57) ABSTRACT

An electronic device and method are provided for rotating an object displayed at or by the device. The object may be an entire displayed region of a display screen, such as a window, frame, or other region or subregion, or a block element or other type of content component such as an image or map. A first input defining a reference point for the object is detected at a first user interface mechanism. After commencement of the detected first input, a second input at a second user interface mechanism, such as a touchscreen display, is detected. In response to the second input, a rotation transformation is applied to the object, the rotation transformation center being defined by the reference point, and the rotation transformation angle being defined by the second input. The object may be displayed by the touchscreen display, or by a display device external to the electronic device.

17 Claims, 12 Drawing Sheets

(56) References Cited

U.S. PATENT DOCUMENTS

| | | |
|---|---|---|
| 2010/0149114 A1 | 6/2010 | Li |
| 2010/0171712 A1* | 7/2010 | Cieplinski et al. ............ 345/173 |
| 2010/0289754 A1 | 11/2010 | Sleeman et al. |
| 2010/0328261 A1* | 12/2010 | Woolley et al. ............... 345/174 |
| 2011/0012856 A1 | 1/2011 | Maxwell et al. |
| 2011/0012921 A1 | 1/2011 | Cholewin et al. |
| 2011/0029917 A1 | 2/2011 | Um |
| 2011/0060986 A1* | 3/2011 | Yang ............................ 715/702 |
| 2011/0069019 A1 | 3/2011 | Carpendale et al. |

OTHER PUBLICATIONS

Rubine, D. H.: "The Automatic Recognition of Gestures", Thesis for Doctor of Philosophy in Computer Science at Carnegie Mellon University, Dec. 1991, pp. 1-266.

Microsoft: "Single-Finger Rotation", 2011, retrieved from the Internet on Sep. 22, 2011, URL: http://msdn.microsoft.com/en-us/library/windows/desktop/dd562192, 3 pgs.

Villamor, C., Willis, D., Wroblewski, L.: "Touch Gesture", Reference Guide, Apr. 15, 2010, 7 pgs.

* cited by examiner

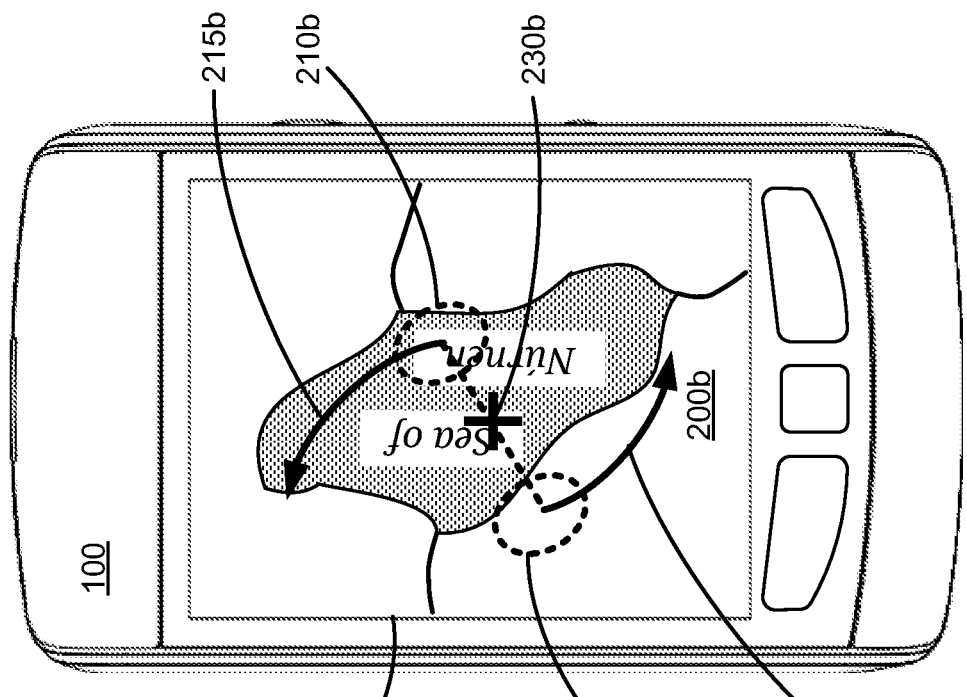
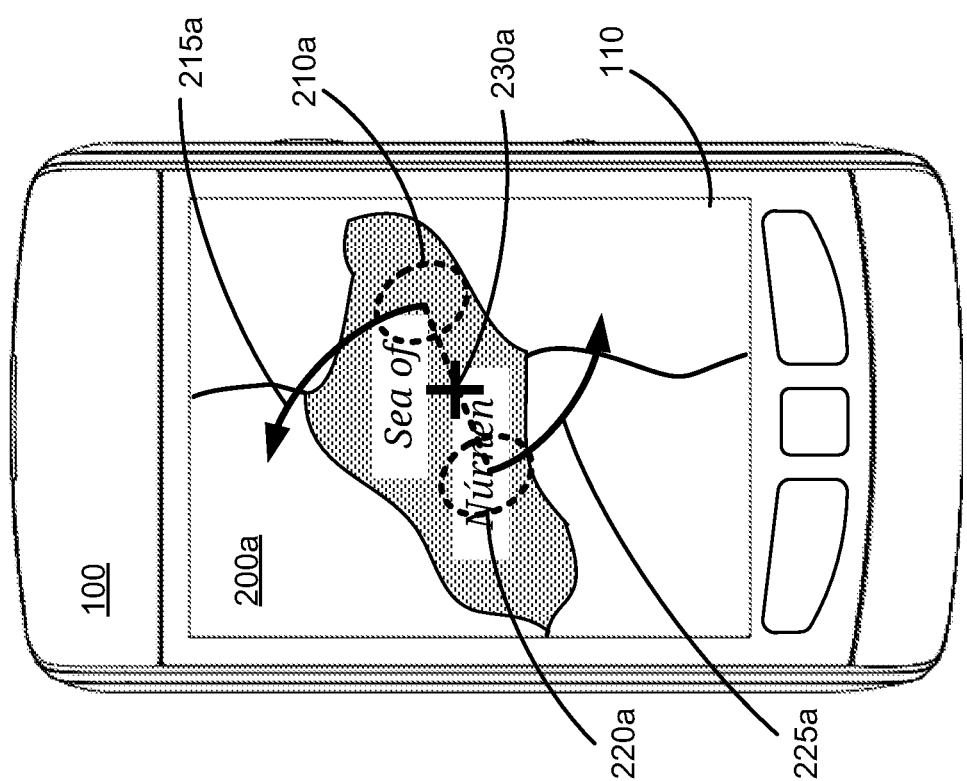

TWO-FACTOR ROTATION INPUT ON A TOUCHSCREEN DEVICE

TECHNICAL FIELD

The present disclosure relates to receipt and processing of user interface inputs at a touchscreen device.

TECHNICAL BACKGROUND

An electronic device having a touchscreen user interface, such as a tablet, smartphone, or tabletop display, can be configured to receive single-touch input, multi-touch input, or both, via its touchscreen display. Input generally includes touches, which are often localized to one particular point of contact with the touchscreen, while gestures involve movement of a contact point (e.g., dragging one's finger) along the touchscreen. Input received via the touchscreen display can be interpreted as commands to alter the content displayed in a view on the touchscreen, for example to scroll, zoom in/out (magnify or reduce), or rotate the content within the view.

Some touch input is more easily conceptualized by users using multi-touch gesture input than by single-touch input. For example, a multi-touch zoom command is commonly implemented through detection of a "pinch" gesture, in which the user simultaneously touches the touchscreen at two initial contact points, usually using the thumb and index finger, then moves the contact points apart or together while maintaining contact on the touchscreen. The simultaneous touch events are detected and interpreted by the device processor as a command to magnify or reduce the displayed size of the content in the current view shown on the display, optionally with a magnification factor calculated from the distance covered by the pinch gesture. The user can easily correlate the pinch gesture to the two-dimensional transformation of zooming, since the user's action mimics the visual effect. The user is also able to control the amount of zooming based on the gesture dimensions.

However, gesture input is constrained not only by the physical size of the touchscreen available to receive the input, but also by the user's own dexterity and flexibility. Typically, only one hand is available to carry out a gesture since the other hand is often employed in holding the electronic device; as a result, such input is conventionally restricted to gestures that can be carried out using one hand. Furthermore, multi-touch input may be less accessible to users with finger or wrist joint problems.

BRIEF DESCRIPTION OF THE DRAWINGS

In drawings which illustrate by way of example only embodiments of the present disclosure, in which like reference numerals describe similar items throughout the various figures.

FIGS. 2A and 2B are schematic diagrams of an example of a multi-touch gesture input for rotating a displayed view or object.

DETAILED DESCRIPTION OF THE INVENTION

Figure 1:
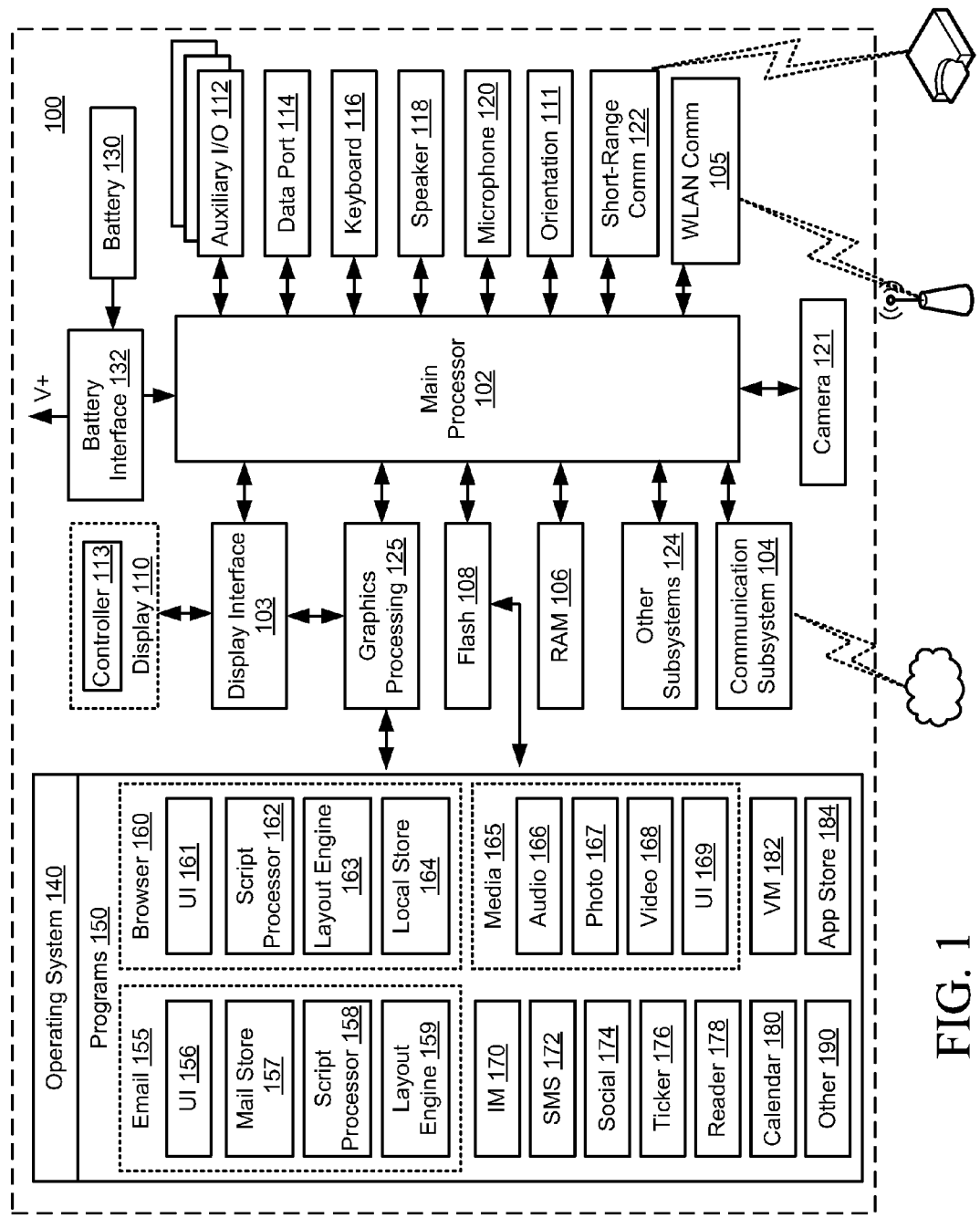
FIG. 1 is a block diagram of an example of an electronic device.

The embodiments described herein provide a device, system and method for inputting and detecting an object transformation command via a touchscreen display, which may be either a single-touch or multi-touch enabled touchscreen display. The object transformation command, which is described below in the context of a free rotate command, allows for efficient and accurate user input to define a reference point for the transformation (e.g., a center of rotation) and a parameter for the transformation (e.g., an angle of rotation), that is not subject to the same constraints as a conventional single-handed, multi-touch gesture command.

These embodiments will be described and illustrated primarily in relation to electronic devices, such as tablet computers, smartphones, personal computers, laptops, or any other suitable electronic device provided with a touchscreen display as a user interface mechanism. It will be appreciated by those skilled in the art, however, that this description is not intended to limit the scope of the described embodiments to implementation on these particular devices. For example, the methods and systems described herein may be applied to any appropriate communication device or data processing device adapted to process data for display and to send the processed data for display to a touchscreen display, whether or not the device is adapted to communicate with another communication or data processing device using a network communication interface adapted to communicate over a fixed or wireless connection, whether provided with voice communication capabilities or not, and additionally or alternatively adapted to process data and carry out operations on data in response to user commands for any number of purposes, including productivity and entertainment. Thus, the embodiments described herein may be implemented on electronic devices including without limitation cellular phones, smartphones, wireless organizers, personal digital assistants, desktop computers, terminals, laptops, tablets, ebook readers, handheld wireless communication devices, notebook computers, portable gaming devices, tabletop displays, Internet-connected televisions, set-top boxes, digital picture frames, digital cameras, in-vehicle entertainment systems, entertainment devices such as MP3 or video players, and the like. In the primary examples described herein, the electronic device includes an integrated touchscreen display; however, it will be readily understood by those skilled in the art that the electronic device may be configured to output data to be painted to an external touchscreen display unit such as an external monitor or panel, tablet, television screen, projector, or virtual retinal display (via a data port or transmitter, such as a Bluetooth® transceiver, USB port, HDMI port, DVI port, and the like). References herein to a "display," "display screen" or "display interface" and to a "touchscreen display," "touchscreen display screen" or "touchscreen display interface" are intended to encompass both integrated and external display units.

FIG. 1 is a block diagram of an example of an electronic device 100 that may be used with the embodiments described herein. It should be understood that the components described in FIG. 1 are optional and that an electronic device used with various embodiments described herein may include or omit components described in relation to FIG. 1. The electronic device 100 includes a number of components such as a main processor 102 that controls the device's overall operation. The electronic device 100 may be a battery-powered device, having a battery interface 132 for receiving one or more batteries 130. Alternatively or additionally, the electronic device 100 may be provided with an external power supply (e.g., mains power, using a suitable adapter as necessary). If configured for communication functions, such as data or voice communications, one or more communication subsystems 104, 105, and/or 122 in communication with the processor as included. Data received by the electronic device 100 can be received via one of these subsystems and decompressed and/or decrypted as necessary using techniques known to persons of skill in the art.

For example, data may be communicated to and from the electronic device 100 using the communication subsystem 104 over a wireless network. In this example, the communication subsystem 104 is configured in accordance with one or more wireless communications standards. New wireless communications standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 104 with the wireless network represents one or more different Radio Frequency (RF) channels, operating according to defined protocols specified for the wireless communications standard, and optionally other network communications. The communication subsystems 104, 105, 122 typically include a receiver, transmitter, and associated components such as one or more embedded or internal antenna elements, local oscillators, and a digital signal processor in communication with the transmitter and receiver. The particular design of the communication subsystems 104, 105, 122, or other communication subsystem is dependent upon the communication network with which the subsystem is intended to operate.

The electronic device 100 may be provided with other communication subsystems, such as a wireless LAN (WLAN) communication subsystem 105 or a short-range and/or near-field communications subsystem 122 also shown in FIG. 1. The WLAN communication subsystem 105 may operate in accordance with a known network protocol such as one or more of the 802.11™ family of standards developed or maintained by IEEE. The communications subsystems 105 and 122 provide for communication between the electronic device 100 and different systems or devices without the use of the wireless network, over varying distances that may be less than the distance over which the communication subsystem 104 can communicate with the wireless network. The subsystem 122 can include an infrared device and associated circuits and/or other components for short-range or near-field communication.

It should be understood that integration of any of the communication subsystems 104, 105, 122 within the device chassis itself is optional. Alternatively, the communication subsystem may be provided in a dongle or other peripheral device (not shown) connected to the electronic device 100, either wirelessly or by a fixed connection to provide the electronic device 100 with wireless communication capabilities. If provided onboard the electronic device 100, the communication subsystems 104, 105 and 122 may be separate from, or integrated with, each other.

The main processor 102 also interacts with additional subsystems, if present, such as a Random Access Memory (RAM) 106, a flash memory 108, a display 110, other data and memory access interfaces such as an orientation sensor or module 111, auxiliary input/output (I/O) subsystem 112, data port 114, a keyboard 116, a speaker 118, a microphone 120, a camera 121 and other device subsystems 124. The device 100 may include multiple such components, such as multiple I/O subsystems 112, multiple data ports 114, and multiple cameras 121.

In some examples, the electronic device 100 may be a touchscreen-based device, in which the display 110 includes a touchscreen interface that provides both a display for communicating information and presenting data in visual form (e.g., text and graphic forms), as well as an input subsystem for detecting user input via a graphical user interface presented on the display 110 that may be converted to instructions for execution by the device 100. A display 110 that is a touchscreen may be the principal user interface provided on the electronic device 100, although in some examples, additional buttons, variously shown in the figures, or a trackpad or other user interface mechanism may be provided. If a touchscreen display is provided, then other user input mechanisms such as the keyboard 116 may or may not be present. Whether the display 110 is a touchscreen or not, or an external or integrated screen, rendered data for painting to the display is provided to the display 110 via a display interface 103. A user interface mechanism may be implemented at the electronic device 100 as hardware, software, or a combination of both hardware and software. For example, if a microphone 120 is provided for the electronic device 100, a voice user interface mechanism may be implemented at the electronic device 100. The microphone 120, together with modules implemented in hardware or software operable to detect speech patterns or other sounds, and to decode or correlate detected sounds to user commands, may operate as a voice user interface mechanism for controlling device operation through spoken commands.

The display controller 113 and/or the processor 102 may detect a touch by any suitable contact member on the touch-sensitive display 110. The configuration of the touchscreen display and display controller for detecting touches will be known to those skilled in the art. Non-limiting examples in the art include United States Patent Application Publication Nos. 2004/0155991, 2009/0244013, 2010/0128002 and 2010/0156843, the entireties of which are incorporated herein by reference. The touchscreen display may be a capacitive touchscreen display with a capacitive touch-sensitive overlay having multiple layers including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO). Optionally, the electronic device 100 may also provide haptic or tactile feedback through the housing of the device 100, or through the touchscreen itself.

The touchscreen sensors are configured to detect and support single-touch, multi-touch, or both single and multi-touch actions such as tap, double-tap, tap and hold, tap and drag, scroll, press, flick and pinch. A touchscreen enabled to detect only single-touch input is able to accurately identify only one point of contact on the display at a time. A multi-touch touchscreen is able to accurately identify two or more simultaneous contacts on the screen. The touchscreen display 110 detects these single and multi-touch actions, for example through the generation of a signal or signals in response to a detected contact, which may then be processed by the processor 102 or by an additional processor or processors in the device 100 to determine attributes of the touch event, such as the location of the touch action, whether defined by horizontal and vertical screen position data or other position data. The detected touch actions may then be correlated both to user commands and to an element or elements displayed on the display screen or view presented by the display 110. In response to the user command, the processor may take actions with respect to the identified element or elements. Touches that are capable of being detected may be made by various contact objects, such as thumbs, fingers, appendages, styli, pens, pointers and the like, although the selection of the appropriate contact object and its construction will depend on the type of touchscreen implemented on the device.

The auxiliary subsystem 112 can include user interface mechanisms such as a mouse, trackball, infrared fingerprint detector, or a roller wheel with dynamic button pressing capability, optical joystick, trackpad, or similar input device. These user interface mechanisms may be provided in addition to a touchscreen display. The optional orientation sensor 111 detects the orientation of the display 110. In the case of a portable (such as a handheld) electronic device 100, the display 110 is typically integrated with the device 100, and the orientation module 111 is as well. The orientation module 111 may include any suitable module that may be selected by those skilled in the art, such as an accelerometer which may be used to detect gravity- or motion-induced forces and their direction. The orientation or acceleration detected at the electronic device 100 (or at the external display 110) may be processed to determine a response of the electronic device 100, such as an orientation of a graphical user interface displayed on the display 110 in response to a determination of the current orientation detected.

A visualization processor or module 125 may be included in the electronic device 100. The visualization module 125 analyzes and processes data for presentation via the display 110. Data originally prepared for visualization on a large-screen display may require additional processing prior to visualization on a small-screen display. This additional processing may be accomplished by the visualization module 125. As will be appreciated by those of skill in the art, the visualization module can be implemented in hardware, software, or a combination thereof, and can include a dedicated image processor and associated circuitry, or can be implemented within main processor 102.

The electronic device 100 also includes an operating system 140 and software components 155 to 190, collectively indicated as programs 150 in FIG. 1. The operating system 140 and the software components 155 to 190 that are executed by the main processor 102 are typically stored in a persistent store such as the flash memory 108, which can alternatively be a read-only memory (ROM) or similar storage element (not shown). Those skilled in the art will appreciate that portions of the operating system 140 and the software components 155 to 184, such as specific device applications, or parts thereof, can be temporarily loaded into a volatile store such as the RAM 106. Other software components 190 besides those explicitly illustrated in FIG. 1 can also be included, as is well known to those skilled in the art. Programs 150 may be installed on the electronic device 100 during its manufacture (for example, during initial loading of the operating system 140), or at a subsequent time once the electronic device 100 is delivered to the user. These software applications may be supplied by the electronic device manufacturer or operating system provider, or may be third party applications. The additional applications can be loaded onto the electronic device 100 through at least one of the communications subsystems 104, 105, 122, the auxiliary I/O subsystem 112, the data port 114, or any other suitable device subsystem 124.

Examples of software components that can be installed on the electronic device 100 include messaging applications, such as the email messaging application 155, instant messaging (IM) application 170, and short message service (SMS) service 172; browser application 160; media application or application suite 165; social networking application 172; ticker application 176; ebook or news reader 178; calendar application 180; and other various productivity, entertainment or informational applications such as games, word processors, file viewers, and the like. Select components of the email messaging application 155 include a user interface module 156 for rendering user interface elements for use in display screens of the messaging application; a mail store 157, which in practice may be located in a distinct location in the memory 108; a script processor, plug-in, or virtual machine 158 for executing code snippets, scripts and the like embedded in, received with, or invoked by the message being processed by the application; and a layout engine 159 for generating a rendered version of email messages for output to the display 110. One or more virtual machines 182 may be provided on the electronic device 100 for executing applications requiring a runtime environment other than that provided by the operating system 140. A further "application store" application 184 may provide access over a network to a vendor site offering software applications for download (and optionally for purchase) to the electronic device 100.

FIG. 1 also illustrates possible principal components of the browser application 160 and media application or suite 165. The browser application 160 includes a user interface engine 161, layout or rendering engine 163, a script processor, plug-in, or virtual machine 162 for executing code snippets, scripts and the like embedded in, received with, or invoked by the webpage being processed. The browser application 160 may also have its own local store 164, allocated to the application from the volatile and/or non-volatile memory 106, 108 of the electronic device 100. The media application or suite 165 includes modules or engines, which may be independently executing applications, for processing and rendering audio files 166, photographs and other image files 167, and video files 168. Each of these modules may be provided with their respective user interface module or engine 169, or may each interoperate with the same user interface module 169.

In use, the electronic device 100 displays various types of visual content objects or elements (such as graphical and text content) on the display 110. For ease of reference, the term "object" will be used and will be understood to be equivalent, where appropriate, to a content "element" and not restricted to a specific programmatic definition. These various objects may be contained within parent objects themselves, as in the case of content comprised within a webpage. A webpage retrieved from a network resource (e.g., a web server) over a network may include embedded media content, images, or text elements. The rendered and displayed webpage may thus also be considered to be a distinct object, albeit one that contains other objects. Other objects can include user interface "chrome", i.e., the standard graphical user interface components provided by the user interface engine or module of an application. Examples of such chrome include browser application title bars, menu options, the appearance of form elements and buttons, and the like. An object, however, need not be contained within a parent object. An object can also be a single user interface view displayed on the display 110 that might be generated by an application or the operating system for use as a graphical user interface. Thus, for example, a message inbox view generated by a messaging application, containing a listing of individual messages, may be considered an object, as may be a single image file rendered and displayed using the media application 165, or a still or frame generated by a game application. The user interface view generated by the browser application 160 containing various objects such as a title bar, a rendered webpage, and images embedded within that webpage or a frame of that webpage, is likewise an example of an object.

Typically, for those applications or operating systems that are responsive to orientation changes detected by an orientation module 111, the displayed user interface view may be rotated in response to a detected orientation change. In such cases, the view is typically rotated by 90°, 180°, or 270°, given that displays 110 are typically rectangular in shape and orientations are typically defined in relation to the horizontal and vertical axes of the display 110. However, in some applications, the rotation of the user interface view or objects contained in the view is not so constrained, and free rotation of an object or objects (i.e., rotation through any user-selected angle, and not merely a 90° increment) is permitted regardless of the electronic device's orientation or changes to its orientation. This may be the case of an image file, a map (which includes an image component and optionally other data), a scene or frame in a game, or an individual object displayed within a game view or view of another application.

In the case of an electronic device 100 equipped with a multi-touch touchscreen as its display 110, a user command to rotate the desired object can be received through a gesture input. Typically, a rotate command requires values for two parameters: an identification of the center of rotation or reference point, and an angle of rotation. In some cases, the center of rotation may be predetermined: for example, the center of rotation may be deemed to be the point at center of the display 110, or else the center of the object to be rotated. The object's center may be programmatically determined by the application developer, or computed based on the object's dimensions. Thus, in the case of an image file displayed by the media application 165, the coordinates of the object center may be deemed to be the midpoints of the image's length and width. When the center of rotation is predetermined, the user is unable to select an alternate center as the reference point for the rotate command. When the center of rotation is user-definable, the user may be able to select the reference point as part of the input multi-touch gesture.

FIGS. 2A and 2B illustrate a typical "twist" rotate gesture on an electronic device 100 having a multi-touch touchscreen display 110. In FIG. 2A, a first view 200a is displayed. To begin the multi-touch rotate gesture, the user initiates contact at two points (using, e.g., a thumb and index finger, or two fingers) on the display 110, as indicated by ovals 210a and 220a. Based on the relative position of the contact points 210a and 220a, a center of rotation 230a can be inferred; in this case, it is computed as the midpoint between the two contact points.

The angle of rotation is then determined by the remainder of the gesture. The user maintains contact on the screen by the two fingers while tracing an arcuate path which each, as indicated by the arrows 215a, 225a; the gesture ends when contact is broken at one or both points of contact (e.g., by the user's fingers being lifted off the display 110, or drifting off an interactive region of the view that is receptive to rotation input). The paths of the gesture is detected by the touchscreen sensors and the resultant data is provided to the processor 102 to compute an angle of rotation based on the curvature of the detected path, the center of rotation, and optionally the direction of travel of the gesture. The angle may be based on an average of the angles derived from the individual paths indicated by the arrows 215a, 225a. Techniques for converting input multi-touch arcuate gestures to a degree of rotation will be known to those skilled in the art.

In response to the gesture, the selected object is then rotated and redrawn on the display 110. The redrawing of the object on the display 110 may involve a complete re-rendering of the object's underlying data, or a mathematical transformation of the already-existing rendered object data stored in the device memory 106 or 108. The latter technique may be preferred where complete rendered data for the object is already stored in memory, which may be the case where an image file or webpage was rendered for display, and the entire rendered file is temporarily stored in a cache or backing store. To enhance user experience by improving the apparent responsiveness of the electronic device 100, the object may be redrawn periodically or substantially continuously as the rotation gesture is being input by the user. However the redrawing is accomplished, in some examples it may be carried out with the assistance of the visualization module 125. Again, techniques for computing and redrawing an object under a rotation transformation will be known to those skilled in the art.

In one variation, the multi-touch rotate gesture is a "pivot" gesture, not illustrated. In a pivot gesture, a first contact point remains substantially stationary while the second contact point moves in an arcuate path around the first contact point. The reference point is thus determined by the first contact point, and the angle of rotation is determined by the path traced by the second contact point; the gesture ends when contact is broken at either point.

The multi-touch gesture provides a compact means of inputting a free rotate command. However, the degree of rotation that can be expressed using a single multi-touch twist or pivot gesture is limited by the user's physiology. Typically, users find it uncomfortable to execute a pivot gesture over an arc extending past 180°, or a twist gesture beyond about 135°. Thus, when the user wishes to rotate the object over a larger angle, the user must break contact and end the first gesture, the re-establish contact to execute a second gesture. For example, once the twist gesture illustrated by the arrows 215a, 215a in FIG. 2A is complete, the object will have been rotated by approximately 90°, as shown in the view 200b of FIG. 2B. At this point, the user must repeat the rotate gesture in order to rotate the object to 180° from its original orientation. As illustrated in FIG. 2B, the user must re-establish contact points 210b, 220b, then complete the gestures by tracing paths 215b, 225b. However, because contact was broken from the first gesture of FIG. 2A to the second gesture of FIG. 2B, the user may not position his fingers at the same contact points as in the first gesture, with the result that the reference point during the second gesture, 230b, will be offset from the original center of rotation during the first gesture, 230a. Thus, once the rotation of FIG. 2B is complete, the appearance of the view 200b will not actually be the same it would have been, had a 180° rotation been completed based on the original reference point 230a.

Overall, then, using the multi-touch rotate gesture to input a rotate command for an angle greater than about 135° or 180° may result in a loss of accuracy, because the rotate gesture must be broken up into two or more gestures. In the case of a small electronic device 100 such as a smartphone or tablet, the user's other hand is typically engaged in holding the device steady for the other hand, which is executing the gesture. Since rotating the electronic device itself may result in an automatic change in orientation of the view 200a or 200b (if the electronic device 100 is equipped with an orientation module 111, and the currently executing application is responsive to changes in orientation), rotating the electronic device with the other hand while the gesture is being executed may not be an option. It may also be noted that even if the electronic device 100 is not being held by the user's hand, and both hands are free to engage in the multi-touch twist or pivot gesture, there are still constraints on the size of the rotation angle that can be input; at some point during the gesture, for example past 180° or 270°, the user's two fingers or hands would cross and obstruct each other. However, a benefit of the multi-touch rotate gesture is that the gesture is conceptually easy for the user to understand and visualize, because the user action physically corresponds to the actual rotation transformation that is applied to the object: the gesture comprises a two-dimensional path representing the arcuate path that a point on the object would trace as it undergoes the rotation transformation.

Figure 3A:
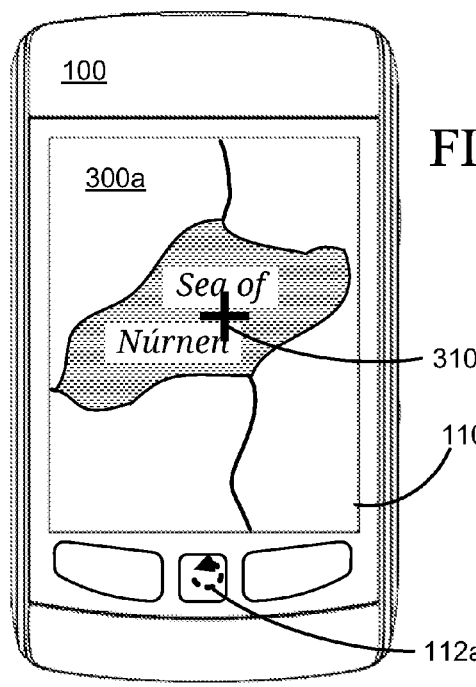
FIGS. 3A, 3B and 3C are schematic diagrams of an example of a multiple-factor input for rotating a displayed view or object.

Accordingly, in place of the multi-touch twist or rotate gesture, a multiple-factor input is used to input a free rotation command, while maintaining the physical correspondence between the user action and the desired rotation transformation. Turning to FIG. 3A, another view 300a on the touchscreen display 110 of an electronic device 100 is shown. In this case, however, rather than relying on multiple touches to identify a reference point for the rotation transformation, another user interface mechanism is used to identify the reference point. In this example, input at a first user interface mechanism 112a, for example a trackpad, trackball, or optical joystick, is used to determine the reference point 310. The user may manipulate the first user interface mechanism 112a to position a cursor or pointer at the desired location on the display 110, then click, tap, press, or otherwise actuate the first user interface mechanism 112a to set the reference point 310. Selection of the reference point 310 may also select a particular object to be rotated, if the view 300a contains multiple objects that can be individually rotated. Once the reference point 310 is set, a gesture command is then input as shown in the view 300b of FIG. 3B, starting with an initial contact point 320 and following a generally arcuate path 315, to define the angle of rotation. The reference point 310 may be visually indicated in the view 300b to assist the user in inputting the gesture command.

Figure 3B:
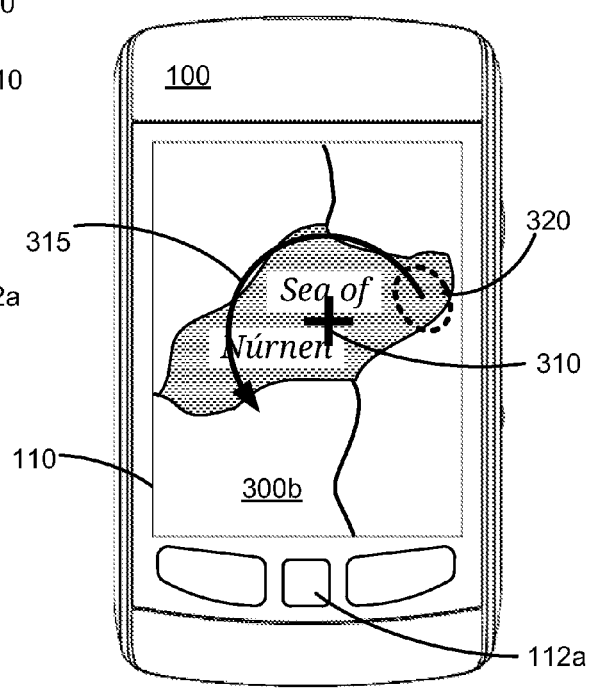
Figure 3C:
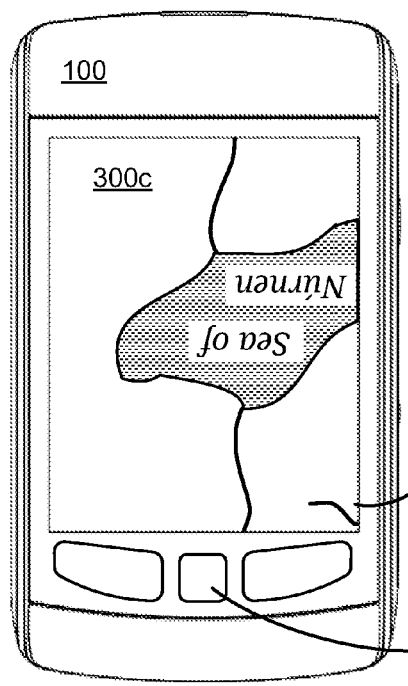

In the example of FIG. 3B, a 180° path has been traced by the gesture; thus, the final appearance of the object is that of a 180° rotation transformation around reference point 310, as shown in the view 300c of FIG. 3C. Thus, the multiple-factor input enabled input of a rotation angle greater than 135° with a single, continuous gesture. It will be readily appreciated by those skilled in the art that the multiple-factor input may be used to input a touchscreen rotate command for rotation angles greater than 180°, 270°, and indeed greater than 360° without requiring the rotate command to be broken up among multiple gesture inputs. Further, as those skilled in the art understand, the trackpad, optical joystick or other user interface mechanism 112a is typically positioned on the device housing so that it is easily manipulated by the user's hand holding the electronic device 100 (for example, the mechanism 112a is typically positioned within reach of the user's thumb); accordingly, executing this multiple-factor rotate command does not require the user to reposition or alter his or her grip on the device 100.

Figure 4:
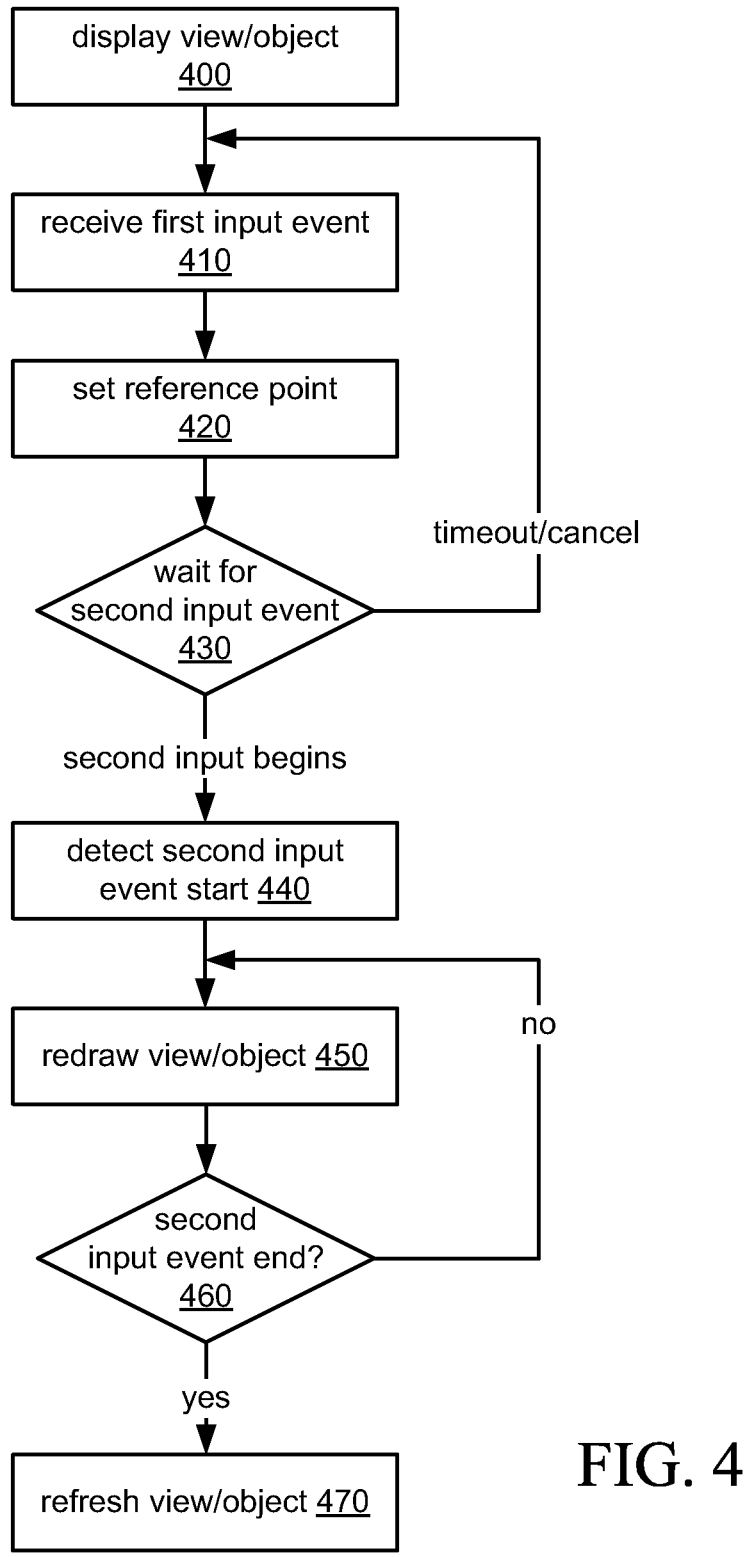
FIG. 4 is a flowchart of an example method for rotating a displayed view or object in response to consecutive multiple inputs.
Figure 6A:
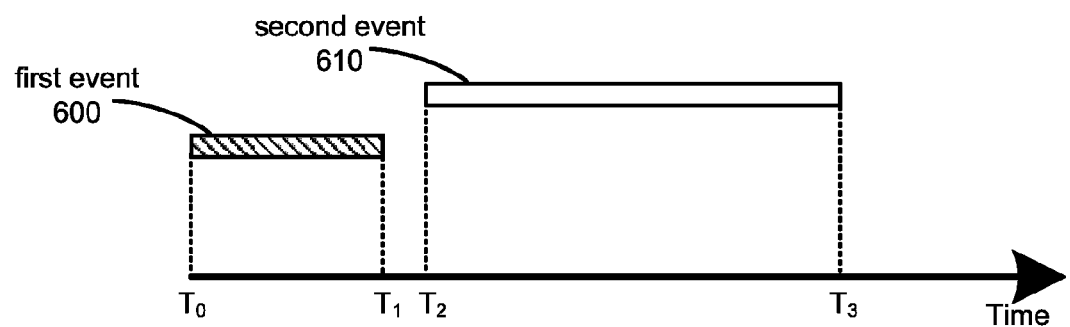
FIGS. 6A and 6B are timing diagrams illustrating consecutive multiple inputs for the method of FIG. 4.
Figure 6B:
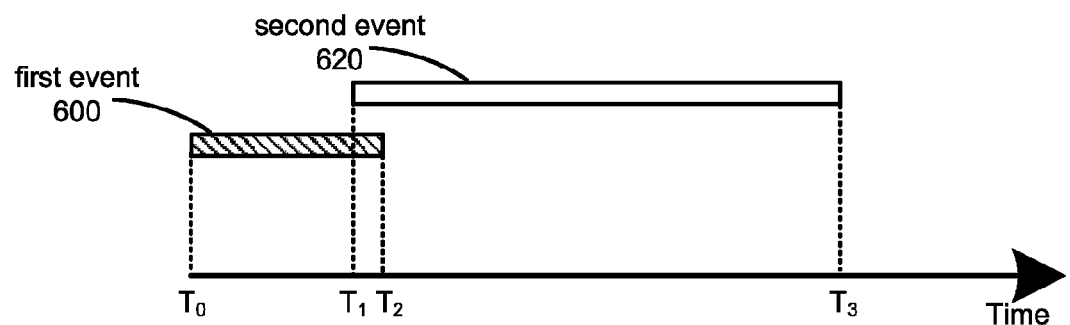

The multiple-factor input may be implemented in either a consecutive or concurrent mode. FIG. 4 and the timing diagrams of FIGS. 6A and 6B illustrate the consecutive mode. Turning to FIG. 4, in an initial state, the original view or object is displayed on the touchscreen display at 400. At 410, a first input event is received. As described above, this first input event may be input at a first user interface mechanism 112a, such as a trackpad, trackball, or optical joystick. A user interface mechanism of this type, i.e., a pointing device or analogous navigation device, permits the user to input spatial data into the electronic device, typically using physical movements or gestures. For example, a typical pointing device permits the user to move a cursor or pointer in two dimensions on the display 110 to fix the reference point, without requiring the user to interact with the object or view itself on the touchscreen. The first input event includes a selection of the cursor or pointer position on the screen, for example by means of a click or press-and-release on the first user interface mechanism (i.e., a pointing device event), or some other actuation of a user interface mechanism. In response to receipt of the first input event, the reference point for the rotation transformation is set at 420. As one example, if the first user interface mechanism is a pointing device, the first input event may comprise a "mouseclick" event, or a combination of a "mousedown" event followed by a "mouseup" event. Detection of the first input event then fires an event handler that causes the coordinates of the pointer at the time of the event to be stored as the reference point. Terminology such as "mousedown" and variants will be recognized by those skilled in the art as common terminology used in a number of programming languages to describe events triggered by a pointing device user interface mechanism, and not necessarily limited to a mouse pointing device. For example, "mousedown" may apply to any depression or activation of a button, trigger, pad, or similar user interface mechanism, whether that mechanism forms part of a mouse pointing device or not. The input mechanism generating the signal interpreted as a mousedown event need not be integrated with the pointing device; for example, the mousedown or equivalent event may be triggered by a keypress on a keyboard. Use of such event descriptors herein is thus not intended to be limited to a particular programming environment or pointing device. The event handler may comprise code that is executed in response to a detected event—such as the aforementioned pointing device-based events, touch-based events, or other user input events—that is provided either within the application currently executing on the device displaying and applying transformations to the object, or within additional files or code delivered with or in association with the object (in the case of an object comprised or embedded in a webpage, for example, an event handler may be provided in scripts embedded within the webpage itself, or in a file delivered to the electronic device accompanying the webpage).

In some examples, the first user interface mechanism may be used to interact with the displayed object for other purposes besides setting a reference point for rotation. A click on an object that is associated with a different event handler may not cause the pointer coordinates to be stored; instead, the different event handler will fire and cause some other action to be executed. For example, in the case of a displayed webpage or similar document, the object that is clicked might be associated with a hyperlink, and the click may therefore initiate retrieval of another webpage or other resources identified by the hyperlink. In that case, the first input event may be defined as an event that slightly more complex than a simple click, such as a "press and hold" of extended duration (a mousedown that lasts longer than a default duration defined for a simple "click", e.g., longer than 10 milliseconds, before a mouseup event is detected).

Once the first input event has been completed and the reference point set, the electronic device 100 waits at 430 for the start of the second input, which is the gesture input at the touchscreen display 110. The electronic device 100 may be configured to timeout if this waiting state extends beyond a defined period of time, e.g., more than 1 second. If the electronic device 100 times out, then the process must be repeated starting at 410. The electronic device 100 may also be configured to cancel the waiting state in response to some other input, such as actuation of a "back" or "cancel" button, or indeed actuation of any other user interface mechanism besides the touchscreen display 110.

If the waiting state is not cancelled and does not time out, the start of the second input is detected at 440. As data is generated from the detected gesture as the contact point of the gesture moves in the arcuate path described above, an angle of rotation may be computed while the gesture is ongoing, and updated as new data is generated by the gesture. The electronic device 100 may respond while the gesture is ongoing by periodically redrawing the view or object that is the subject of the rotate command at the currently computed rotation angle, with reference to the previously-set reference point, at 450. Once an end to the second input event is detected at 460, if the view or object has not been redrawn at the final computed rotation angle, the display is refreshed at 470 with an updated rotation transformation of the view or object.

The consecutive mode of this multi-factor input method is illustrated by the timing diagrams of FIGS. 6A and 6B. In FIG. 6A, the first input event 600 begins at time $T_0$ and ends at time $T_1$; this first input event may be, as mentioned above, a mousedown and subsequent mouseup event. The second input event at the touchscreen 610 then begins some time after the commencement of the first input event. Here, the second input event begins at time $T_2$ and ends at $T_3$. The second input event, being a touch event, may comprise a "touchstart" event (i.e., initial detection of placement of the user's finger, stylus, or other touchscreen interaction tool on the touchscreen at an initial touch point), and continues as a detected "touchmove" event (i.e., movement of the touch point, the point of contact between the already-placed finger or other tool across the touchscreen, while contact between the finger or tool and the touchscreen is maintained). Detection of the end of the second input event at $T_3$ may comprise detection of a "touchend" or "touchleave" event, in which the touch point is removed, or the touch point is moved outside an interactive region of the touchscreen. As with the use of pointing device terminology, terminology such as "touchstart" and so forth will be recognized by those skilled in the art as common terminology used in a variety of applications and contexts to describe events triggered by the use of a touchscreen interface, and are not limited to one particular implementation.

In the example of FIG. 6A, $T_2$ occurs after $T_1$; therefore, the gap $T_2-T_1$ must be less than the timeout period defined for the multi-factor rotate command, if one is defined. In FIG. 6B, the first input event 600 again begins at time $T_0$ and is of the same duration as the first input event in FIG. 6A; however, the second input event 620 now begins at time $T_1$, before the first input event 600 ends at the time now marked as $T_2$. The second input event again ends at time $T_3$. In the example of FIG. 6B, the start of the second input event 620 may overlap the end of the first input event 600, provided the reference point is determined by the first input event 600 before time $T_1$.

Figure 5:
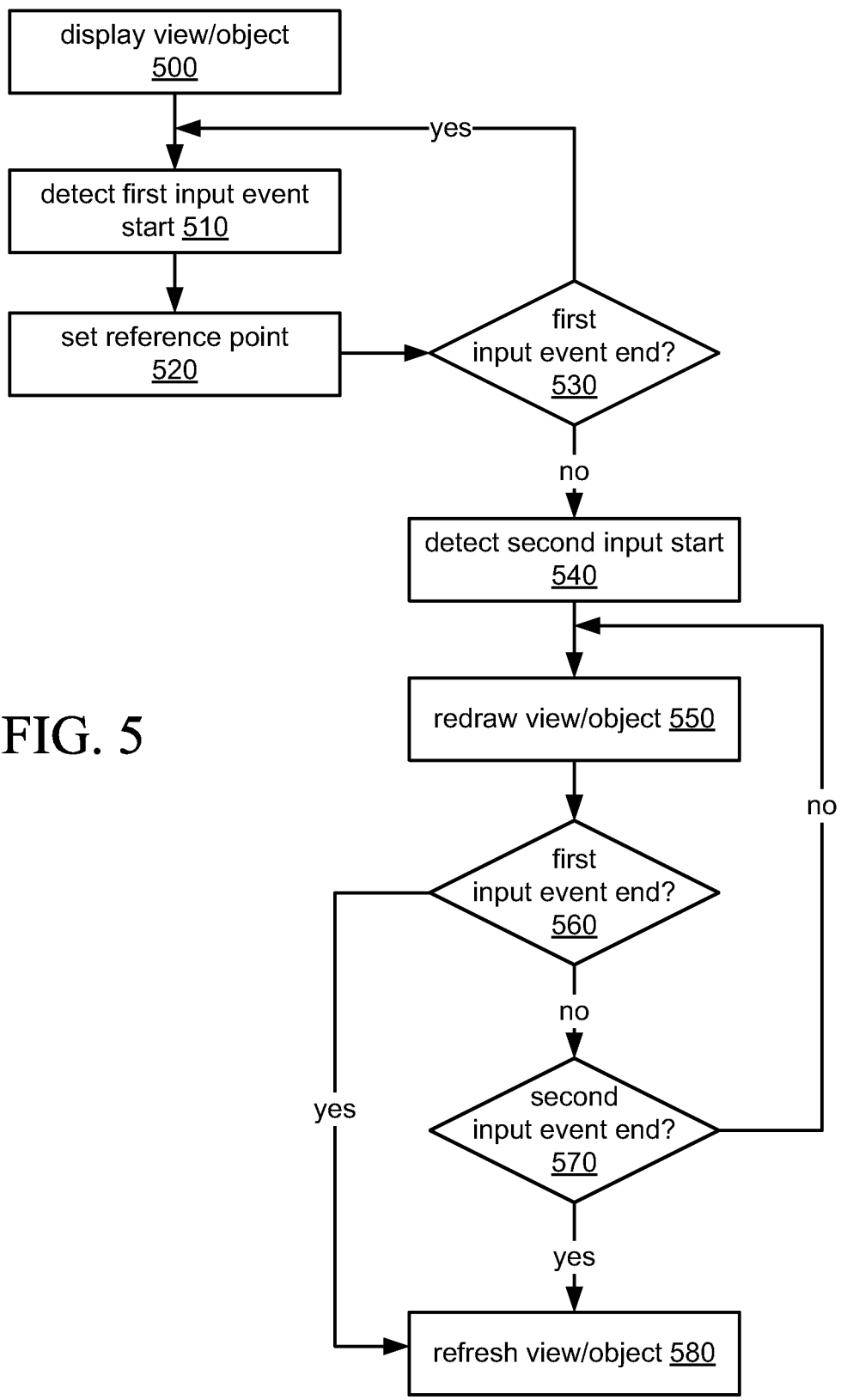
FIG. 5 is a flowchart of an example method for rotating a displayed view or object in response to concurrent multiple inputs.

In another example, the multi-factor input method is carried out in a concurrent mode, where the gesture is input while the first input event is ongoing, and the multi-factor input is deemed to end when a first one of the first input event and the gesture ends; thus, if the first input event is a mousedown-mouseup combination, then the multi-factor input begins when the mousedown event is detected, and ends when the earlier one of a mouseup event or end of the gesture input is detected. The concurrent mode is illustrated in FIG. 5 and FIGS. 7A through 7D. In FIG. 5, the method starts with display of the view or object to be rotated at 500. At 510, the start of the first input event is detected, and the reference point for the rotation transformation as identified by the first input event is set at 520. Referring again to the mousedown-mouseup event example, the start of the first input event and identification of the reference point may be effected by a mousedown event; the user may then keep the button, trackpad, or other user interface mechanism used to implement the first input event activated. Provided the first input event is not determined to have terminated at 530, the method moves on to detect the start of the second input at 540. A determination that the first input event has ended may be made when the user releases the button, trackpad or other mechanism (i.e., triggers a mouseup event). If the first input event ends, then the method awaits a further first input event start.

The second input, as before, is the gesture input on the touchscreen display 110. As in the consecutive mode, as data is generated from the detected gesture as the contact point of the gesture moves in the arcuate path described above, the angle of rotation can be computed while the second input event continues, and the view or object undergoing the rotation may be periodically redrawn at 550 in response to the currently computed angle and reference point. However, if either one of the first input event or the second input event is determined to end 560, 570 respectively, then the multi-factor input is deemed to have ended, and the view or object display is refreshed as necessary at 580 to reflect the final computed rotation angle.

Figure 7A:
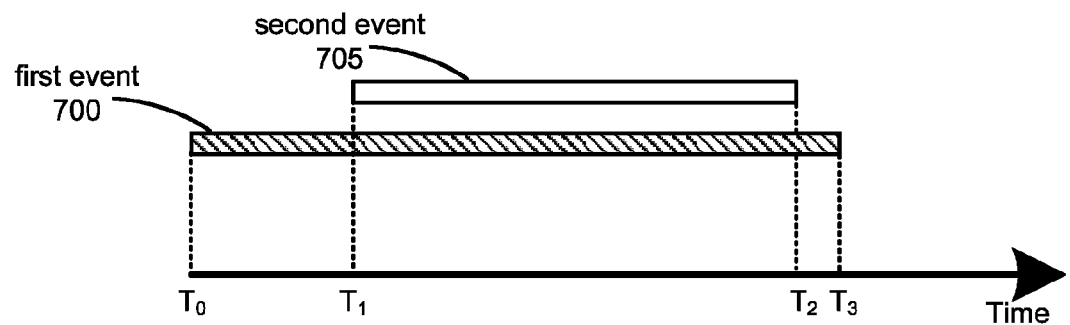
FIGS. 7A, 7B, 7C and 7D are timing diagrams illustrating concurrent multiple inputs for the method of FIG. 5.
Figure 7B:
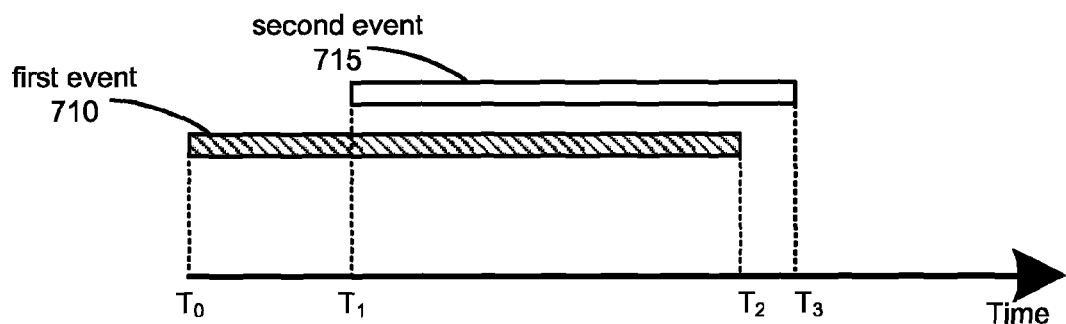

The timing diagrams of FIGS. 7A and 7B illustrate this method. In FIG. 7A, the first input event 700 starts at time $T_0$. The first input event continues until its end at time $T_3$. In the meantime, the second input event 705, the gesture, starts at time $T_1$ and continues to time $T_2$. Thus, the duration of the second input event 705 completely overlaps the duration of the first input event 700; the end of the multi-factor input, then, occurs at time $T_2$, which is the earlier of the end of the first and second input events, and the final rotation angle for the rotation angle is set at time $T_2$, when the gesture input ends.

In FIG. 7B, the first input event 710 again begins at $T_0$ and the second input event 715 at time $T_1$, but the first input event now ends at time $T_2$ before an end to the second input event is detected at $T_3$. In this example, the multi-factor input is determined to end at time $T_2$, which is now the end of the first input event 710. Again, the final rotation angle for the rotation angle is set at time $T_2$, which is now when the first input event 710 ends.

Figure 7C:
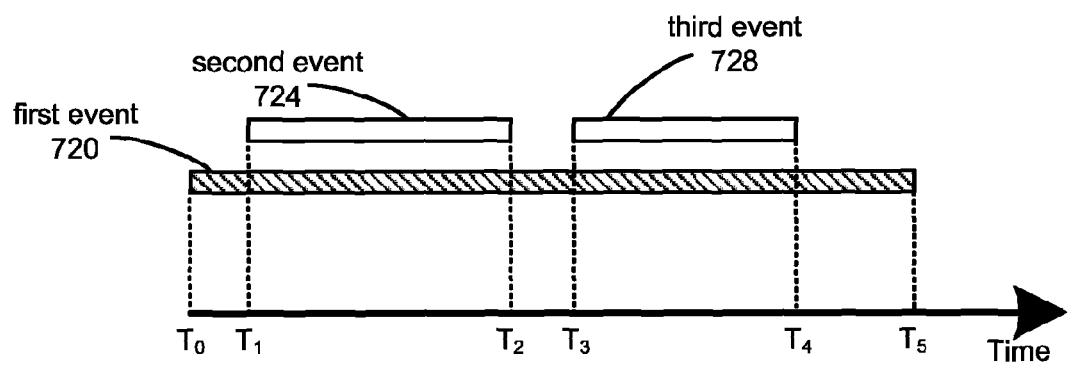

In one variant of the concurrent mode, the multi-factor input is determined to end only if an end is detected for the first input event. Thus, as long as the first input event is ongoing, multiple second input events (i.e., multiple rotation gestures) may occur, and the view or object that is subject to the rotation transformation will be rotated in response to each distinct second input event. Turning to FIG. 7C, the first event 720 begins at time $T_0$ and extends to time $T_5$. During this period, two gesture events, a second input event 724 during times $T_1$ to $T_2$ and a third input event 728 during times $T_3$ to $T_4$, are detected at the touchscreen display 110. Although both the second and third input events 724, 728 end before the first input event 720, the end of the multi-factor input is determined by the end of the first event 720, i.e., at time $T_5$; however, the final rotation angle for the rotation transformation applied to the object is determined by the gesture ending at time $T_4$, since there is no further gesture input after time $T_4$.

Figure 7D:
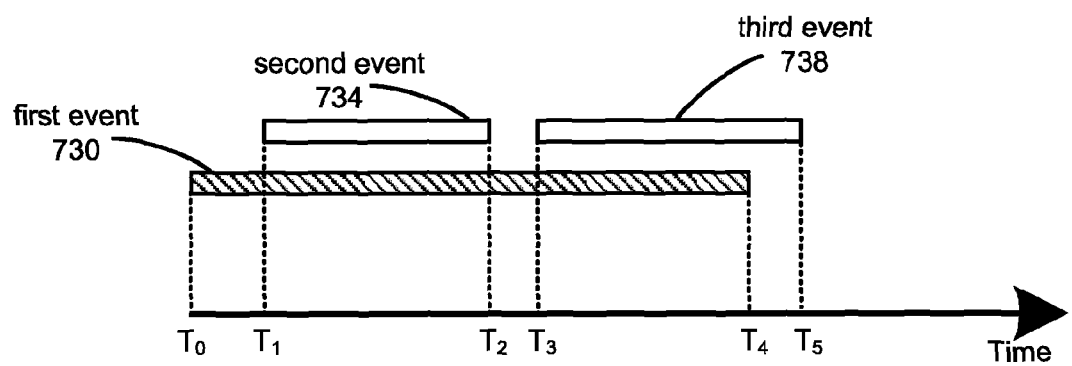

In FIG. 7D, the first input event 730 begins at time $T_0$ and ends at time $T_4$. The first gesture event, which is the second input event 734, starts after the commencement of the first input event 730 at time $T_1$ and ends at time $T_2$. The second gesture event, which is the third input event 738, begins during the first input event at time $T_3$; however, it ends at time $T_5$, which is after the end of the first input event 730. Regardless, the multi-factor input is determined to end at time $T_4$, which is the end of the first input event 730. The final rotation angle of the rotation transformation is thus determined by the angle computed from the third input event 738 at time $T_4$, and not at time $T_5$.

The concurrent mode thus provides the user with the ability to input not only gestures representing rotations greater than those physically possible using the conventional multi-touch pivot or twist gestures, but also to input multiple gestures for multiple rotate commands without needing to re-establish the reference point for the rotation. This improves the accuracy of the subsequent gesture input, since its resultant rotation transformation will be centered on the same reference point as the previous gesture.

FIGS. 8A to 9C illustrate further variants of the multi-factor input. In these examples, the rotation transformation shown is as it might be applied to a frame or subregion of a webpage, rather than to an entire view or object filling the entire display 110 as in FIGS. 3A to 3C. Unlike FIGS. 3A to 3C, which depict a multi-factor input and resultant rotation transformation in three views, the multi-factor input and rotation transformation is consolidated into two illustrations, FIGS. 8A and 8B, 9A and 9B, and 9A and 9C.

Figure 8A:
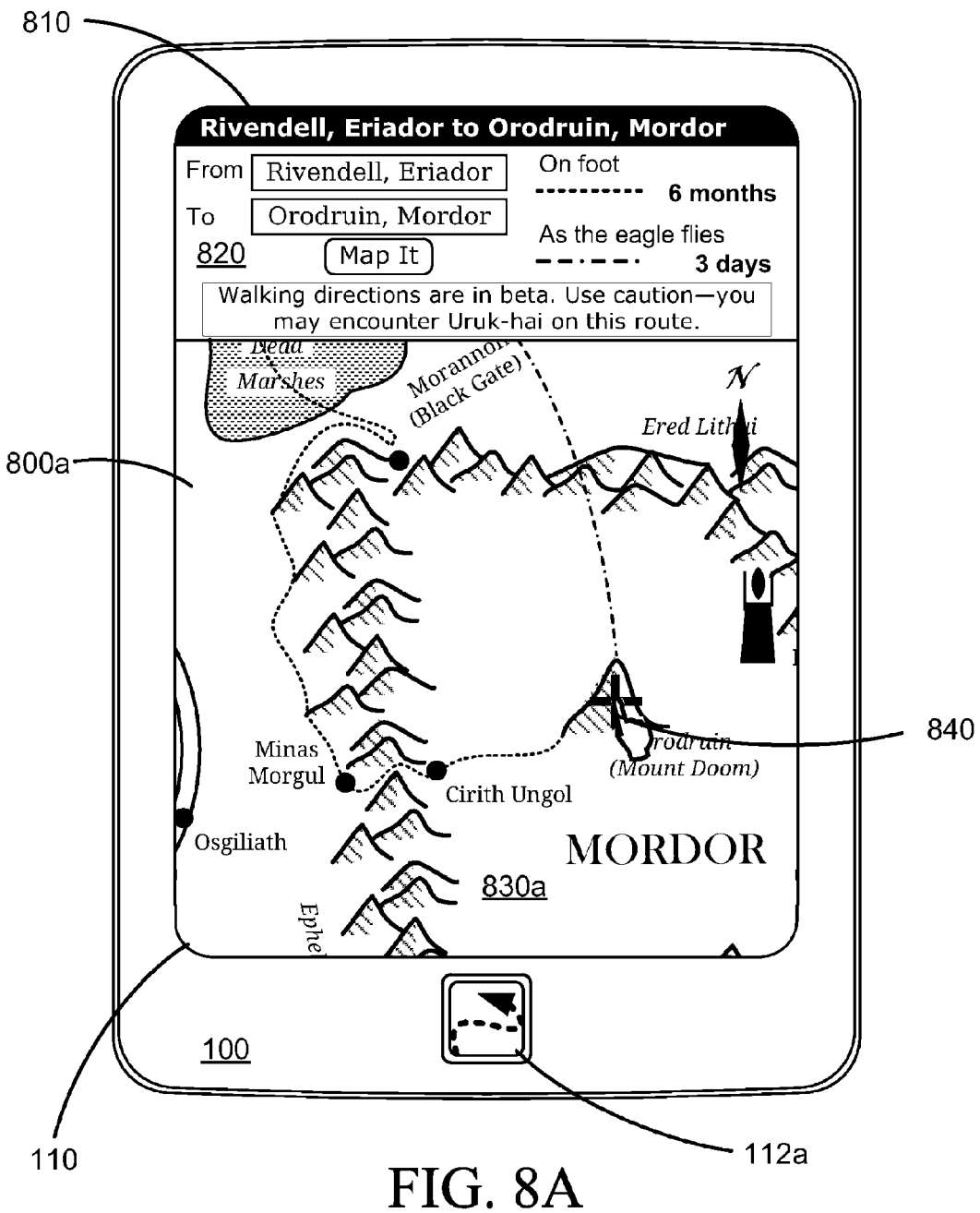
FIGS. 8A and 8B are schematic diagrams of another example of a multiple-factor input for rotating a displayed view or object using two user interface mechanisms.
Figure 8B:
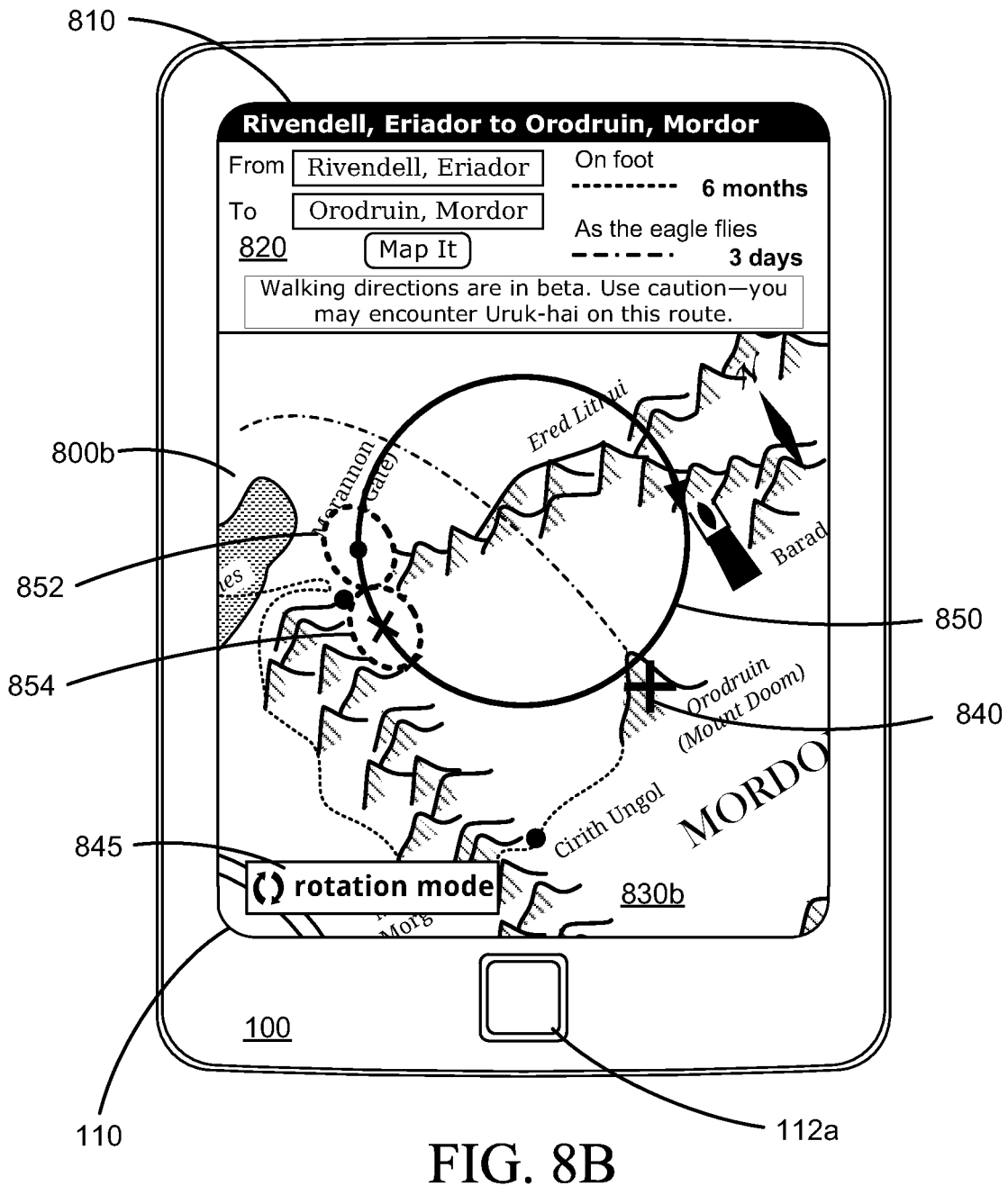

In the example of FIGS. 8A and 8B, a view 800a comprising a webpage is shown as it may be displayed by a browser application, with a title bar 810, first webpage region or object 820, and a second webpage region 830a. In this example the second webpage region contains an image representing a portion of a map. As in the example of FIGS. 3A to 3C, the device 100 displaying the view 800a is provided with a user interface mechanism 112a such as a trackpad or optical joystick. FIG. 8A illustrates the initial position of the second webpage region 830a, prior to the application of a rotation transformation. As indicated by the arrow on the user interface mechanism 112a, the user may use the mechanism 112 to position a cursor or pointer at the desired reference point location 840 in the second webpage region 830a, and may then initiate the first input event by depressing the trackpad or optical joystick, or by activating some other user interface mechanism. In this example, only the second webpage region 830a may be rotated; the first webpage region 820 is intended to remain static regardless of any change to the display of the second webpage region 830a by rotating, scrolling or zooming. Thus, if the user uses the user interface mechanism 112a to move the pointer to the first region 820, depressing or clicking the user interface mechanism 112a will not result in the setting of the reference point. The mousedown or other user interface mechanism event is handled by a different event handler in region 820 than the event handler associated with the same event in region 830a. These various event handlers may be defined within the application displaying the view 800a; however, event handlers may also be configured within the document or resource being displayed in the view 800a. In the case of a webpage, event handling script for the region 830a may be included with the webpage, either within the webpage file itself, or else in an associated file downloaded with the webpage file.

Once the first input event has been initiated in the second webpage region, the electronic device 100 is now receptive to rotation gesture input. The current state of the electronic device 100 may be displayed by an indicator 845 overlaying the second webpage region 830b in FIG. 8B; the indicator 845 indicates that the electronic device 100 is now in a "rotation mode". FIG. 8B shows a possible gesture that may be input at the touchscreen display 110, and also shows the resultant rotation transformation on the content of the second region now marked as 830b. In this example, a rotation of nearly 360° is shown; the gesture begins with a first contact point at 852, then moves in a substantially circular path 850 to the final contact point 854, where the user lifts his or her finger from the touchscreen.

It may be noted in this example that the gesture is not centered on the reference point 840 at all; rather, it is offset from the reference point 840 and positioned instead at approximately the center of the display 110. Since the reference point 840 was defined by the first input event using the user interface mechanism 112a (whether in the consecutive or concurrent modes described above), it is not necessary for the gesture comprising the second input event to be positioned at the reference point 840 or in any particular location in relation to the center of rotation. This is particularly useful when the reference point 840 is set close to an edge of the display 110. In the pivot or twist multi-touch rotation gestures described above, the user will be unable to execute the pivot or twist gesture if one or more of his fingers drifts off the active region of the touchscreen, since of course contact must be maintained with the touchscreen for the duration of the gesture. This may occur if the desired center of rotation is close to an edge of the display. In those cases, the user must first scroll the object to be rotated so that the desired center of rotation is located in a more central region of the display 110. The multi-factor input described herein, however, mitigates the difficulties arising from choosing a center of rotation close to the edge of the display, and in some cases will eliminate the need to scroll or move the content of the object to be rotated prior to rotation.

Figure 9A:
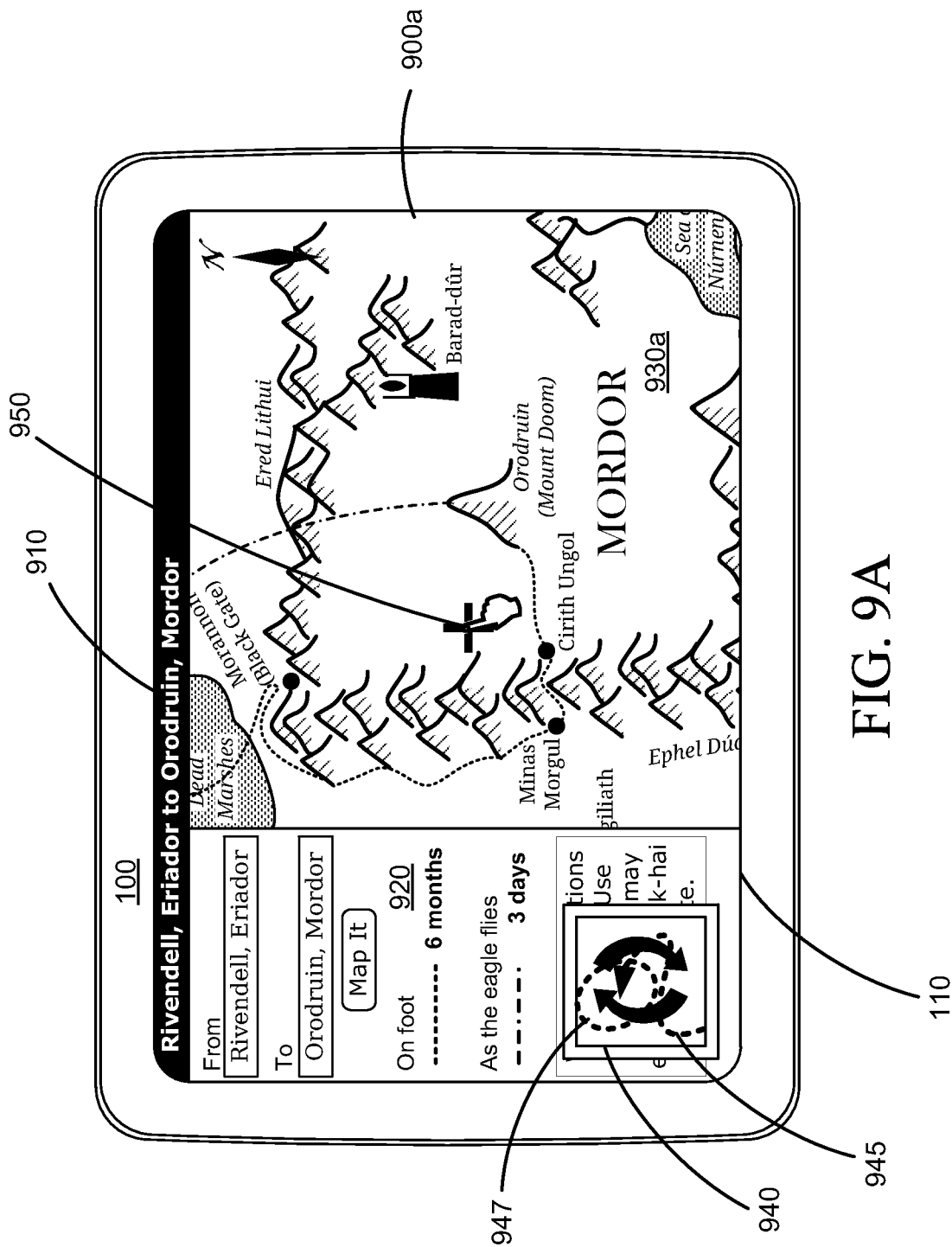
FIGS. 9A, 9B and 9C are schematic diagrams of further examples of multiple-factor input for rotating a displayed view or object using a touchscreen for both inputs.
Figure 9B:
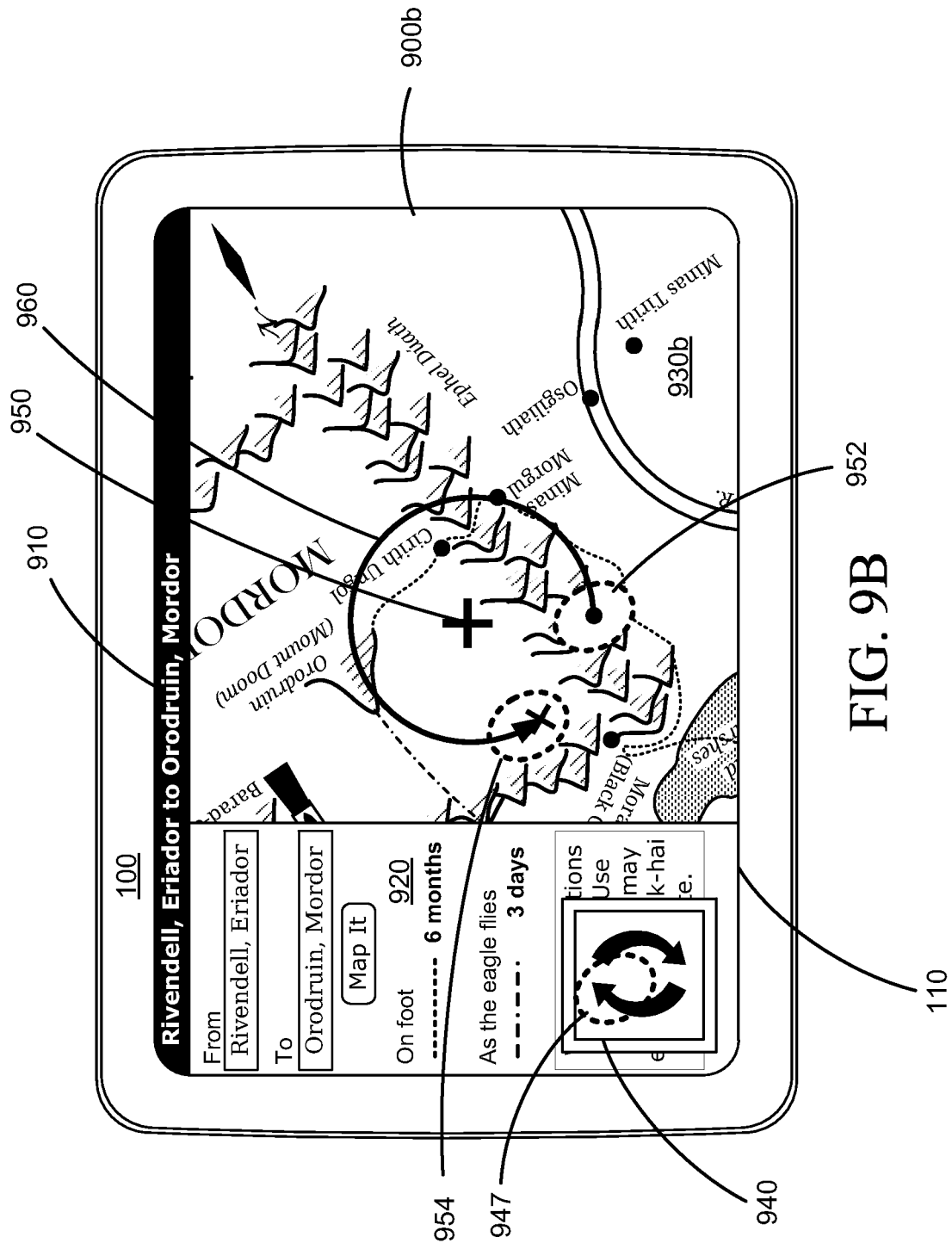
Figure 9C:
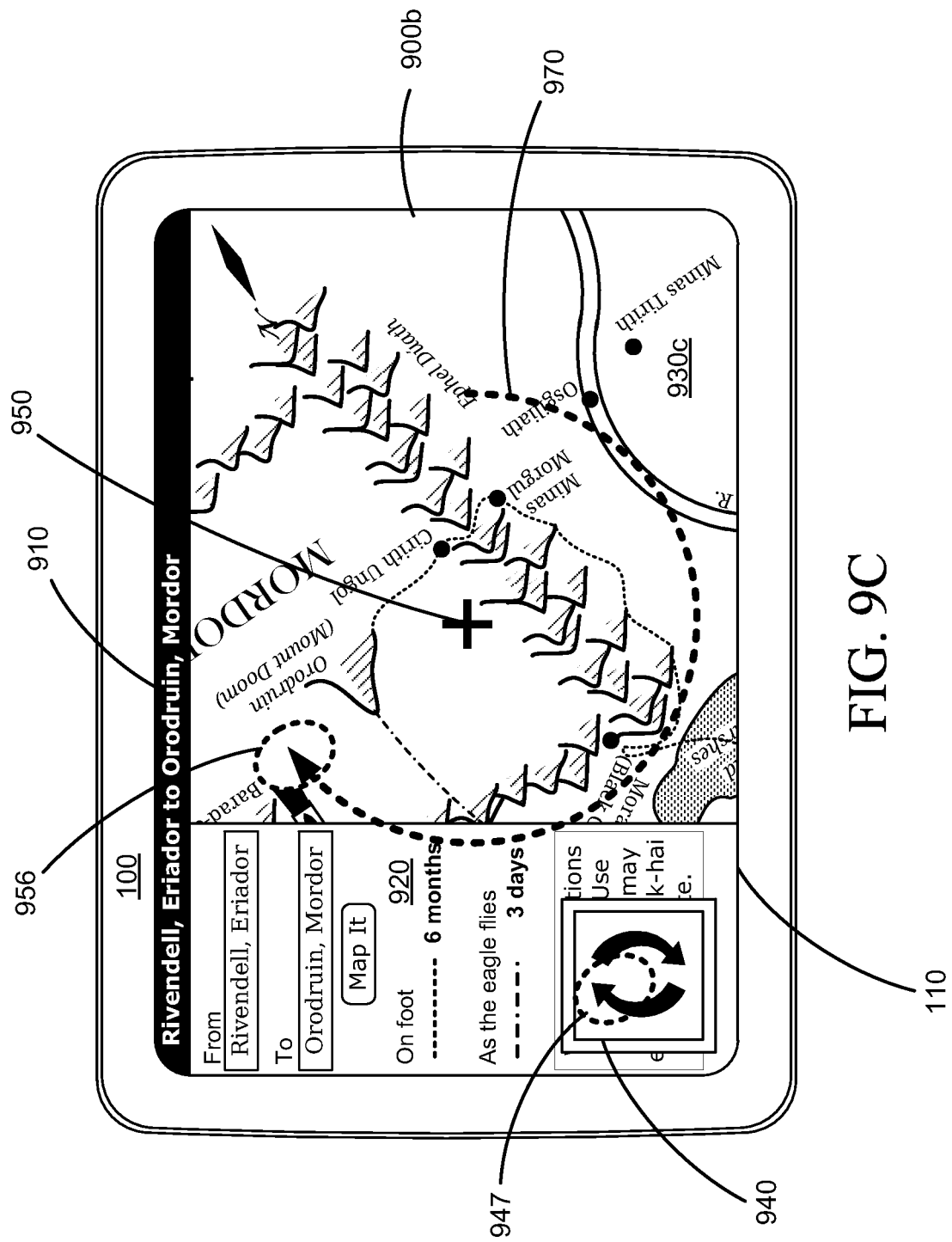

FIGS. 9A, 9B and 9C illustrate two variants of the multi-factor input. A first variant involves implementation exclusively on a touchscreen display 110, without the use of a distinct user interface mechanism 112a as in the earlier examples. In FIG. 9A, the view 900a is a variant of the webpage shown in the earlier example of FIGS. 8A and 8B, again with a title bar 910, first webpage region 920, and third webpage region 930a. In the case of a touchscreen tablet computer, no integrated pointing device or analogous device may be available for navigating a cursor on the display. A touchscreen interface often responds differently to touches than a pointing device; not every event detectable by a touchscreen interface (i.e., a touch event) may be directly mapped to a corresponding pointing device event. For example, a pointing device is used to move a cursor or pointer on the display 110 to a desired location, at which point the pointer "hovers" over that location; when the pointer hovers over a displayed object associated with an appropriate event handler, the electronic device 100 may respond to the hover event by firing that event handler (for example, hovering over an image object may cause the image to be replaced with a different one). When the pointing device button or similar mechanism is activated (e.g. "clicked"), then any object at that location may be selected, and a distinct event handler may fire in response to the click event. On a touch interface, however, the hover event may not be available, since the user typically selects an object by directly touching the touchscreen surface at a position corresponding to that object, and does not need to move a pointer to that location first. Accordingly, in setting the reference point using the multi-factor input method would require a first touch at the desired reference point, followed by the gesture input. In the concurrent mode described above, this would require simultaneous touches, with the attendant difficulties of multi-touch input discussed above.

Thus, if the view 900*a* or application presenting the view is configured in this manner and no external pointing device is provided, a separate navigation touch interface 940 may be displayed within the view 900*a* instead. As can be seen in FIG. 9A, a navigation interface 940 is displayed in the view 900*a*. This navigation interface 940 is superimposed over the other objects displayed in the view 900*a*, in this case over the first region 920 which is static, rather than the second region 930*a* which is capable of being rotated. The navigation interface 940 operates as a touchpad for navigation over the remainder of the screen, permitting the user to trace a path on the interface 940, as indicated by the arrow 945 to a destination point 947, to move a pointer or cursor in the region 930*a* to a corresponding desired reference point location 950. In other words, the navigation interface 940 provides a simulated pointing device. Touch events detected by the navigation interface 940 are used to define pointing device-like behaviour on the display screen outside the area of the navigation interface 940. In the consecutive mode, the reference point 950 may be set by breaking contact at the navigation interface 940. In the concurrent mode, the reference point 950 may be set by the user maintaining contact at that destination point 947. However, unlike a single-handed multi-touch pivot or twist gesture, the reference point position may be maintained on the navigation interface 940 by the user's other hand—that is, the hand holding the electronic device 100 rather than the hand executing gestures—provided the navigation interface 940 is positioned within reach of the user's fingers or thumb. For example, if the electronic device 100 is typically gripped at its lower left edge with the user's left hand, the user's left thumb may be able to easily reach the navigation interface 940 as it is positioned in FIG. 9A, and to move on the surface of the touchscreen display 110 in that region to set the reference point 950.

FIG. 9B illustrates a further view 900*b* with an example gesture for a rotation in excess of 270° that may be input by the user's gesturing hand once the reference point 950 is set, together with the resultant rotation transformation effected by the gesture in the second webpage region 930*b*. The gesture is traced from a first contact point 952, along the arcuate path 960, and ending at the terminating contact point 954.

FIG. 9C illustrates an alternate view 900*c* with another example of a rotation input. This view may follow the initial view 900*a* and setting of the reference point 950 illustrated in FIG. 9A. Instead of tracing an arcuate path as in FIG. 9B, however, the user may simply touch the touchscreen display 110 at a point representing the desired angle of rotation at 956. The electronic device 100 may be configured to compute all angles from a default position (0°), as indicated by the phantom path 970. In this case, all angles are measured from a default "3 o'clock" position in a clockwise direction. Thus, the rotation represented by the touch at contact point 956 represents a rotation greater than 180°. Had the direction of rotation been counter-clockwise, the final orientation of the object shown in the second region 930*c* would have been the same; however, the direction of rotation is relevant if the electronic device 100 is configured to animate the rotation transformation to show the object in motion as it rotates to its final orientation.

Since the reference point 950 was set independently of the input fixing the angle of rotation, a single touch is sufficient. In this example, it would be beneficial to mark the reference point 950 on the display to provide the user with a visual reference. Furthermore, because a gesture need not be input to define the rotation angle, the touch 956 may be located any distance from the reference point 950, provided it is within the active region of the touchscreen display 110 adapted to receive rotation input. In the case of a gesture input, the path traced by the gesture may not be able to exit the active region without being interpreted as an end of the gesture; in the example of FIG. 9C, it can be seen that the imaginary path that would have been traced by the user in a gesture would have drifted out of the second webpage region 930*b* and entered the static region 920. This technique need not be employed with the navigation interface 940, but may be used with the distinct user interface mechanism 112*a* of FIGS. 8A and 8B.

The foregoing examples were described with reference to pointing device and/or touch-based user interface mechanisms. In other examples, user interface mechanisms other than those conventionally operated by user gesture may be used to implement the two-factor rotation command. In one example, a voice user interface mechanism may be used to supply the first input, the second input, or both. Rather than operating a pointing device or simulated pointing device to fix the desired reference point for the rotation transformation (and to optionally select the object to be rotated), the user may issue a voice command that is received and detected via the voice user interface mechanism. In the context of a map application, for example, the user may speak a command (e.g., "go to [location]", "drop pin [location]", or "focus [or center] on [location]") to fix the reference point by coordinates (such as latitude and longitude), by reference to a distance and direction from a known landmark (such as "5 miles northwest of Bywater"), or by an assigned label that may have been previously associated with a geographic location (e.g., "home", "destination", "starting point", and so forth). In other contexts, when rotating a different type of object (such as an image, some other element, or the entire screen), the command to fix the reference point may refer to screen coordinates or descriptive language (such as "screen center" or "bottom right-hand corner of [object]").

Upon detection and processing of this first input by the electronic device 100, the reference point is fixed, and an input to define the rotation transformation angle can be received. Thus, the voice user interface mechanism is most likely to be implemented in the consecutive input mode, as in FIG. 6A. The angle may be defined using the touch input technique described above, or using a different user interface mechanism (such as a pointing device).

Alternatively, a different user interface mechanism (such as a pointing device, or the touchscreen interface) may be used to receive the first input fixing the reference point, and the voice user interface mechanism used to receive the second input defining the angle of the rotation transformation. In this example, the pointing device can be used to navigate to and select the reference point, or the reference point may be defined by a touch event (e.g., a "touchstart"-type event) at the touchscreen. Once the reference point is fixed, the user may then issue a voice command, which is detected by the voice user interface mechanism. The command to rotate may specify an angle (e.g., "rotate 35 degrees", "rotate clockwise 35 degrees"), or may simply comprise a command to start rotating (e.g., "start rotation", "start rotating counter-clockwise"). In response to this In this example, where the voice user interface mechanism is used to receive the second input, the two-factor input can be implemented in either the consecutive or concurrent mode. In the consecutive mode, the first input may constitute a simple "mouse click" or a "tap" on a touchscreen. In the concurrent mode, the first input duration extends into the time during which the second input is received; for example, if the reference point is fixed by a touch input, the user would touch the screen at the desired reference point, then while maintaining contact at that touch point, issue a voice command to be received by the voice user interface mechanism. As one example, in the concurrent mode, the user may simply issue the voice command "rotate clockwise" or "turn clockwise" (or some similar language), and the device processor would operate to commence rotation of the selected object until the user removes the touch point or otherwise terminates the first input.

In these voice-enabled embodiments, it will be appreciated that a default rotation directly may be set (e.g., clockwise). In that case, the voice command need only comprise a rotate command (e.g., "rotate" or "turn"). In any of these voice-enabled examples, it will also be appreciated by those skilled in the art that the touchscreen is not necessary; the first and second input may be received using a combination of user interface mechanisms other than a touchscreen. However, if a touchscreen interface is employed, accuracy of the reference point location is maintained, since the user is not required to engage in the "twist" or "pivot" maneuvers described above.

In still a further example, the voice user interface mechanism may be used for both the first and second input using the techniques described above.

As noted above, the electronic device 100 may be configured to output data to an external monitor or panel, or other display device. A typical configuration is the case of a personal, laptop or tablet computer or other computing console connected to an external monitor or television receiver, where the object to be rotated is displayed by the external display device. The various examples of multiple-factor rotation input may be implemented with this arrangement as well, although a touch input may not be employed directly on the external display device if it is not a touchscreen device. Another typical configuration is one in which the electronic device 100 operates in communication with another computing device in a "screen sharing" or "remote control" mode. For example, a first computing device (such as a tablet or smartphone) may communicate wirelessly (or via a fixed connection) with a second computing device, such as a personal computer provided with its own display device. When the first and second devices are suitably paired or otherwise connected, the user may operate the first device to control the second. In one arrangement, the first device displays an image of the screen displayed by the second device's display device. The user can interact with the image shown on the first device to operate the second device. In that case, multiple-factor rotation input received at the first device may operate on an object displayed by the second device.

Thus, the foregoing embodiments provide a method implemented at an electronic device, the method comprising: detecting a first input at a first user interface mechanism of a plurality of user interface mechanisms of the electronic device, the first input defining a reference point for a displayed object; detecting, after commencement of the detected first input, a second input at a second user interface mechanism of the plurality of user interface mechanisms, the second user interface mechanism comprising a touchscreen display; and in response to the detected second input, applying a rotation transformation to the displayed object, a center of the rotation transformation being defined by the reference point, and an angle of the rotation transformation being defined by the second input.

In one example, the displayed object is displayed by the touchscreen display.

In another example, the displayed object is displayed by a display device in communication with the electronic device comprising the touchscreen display.

In another aspect, at least a portion of a duration of the second input overlaps a duration of the first input, and a final angle of the rotation transformation is determined by an angle of rotation computed from the detected second input at a point that is the earlier of: a detected end of the first input, and a detected end of the second input.

In still another aspect, the object is displayed in a first one of a plurality of regions displayed on the touchscreen display, and in the first region comprising the object, the detected first input is associated with an event handler that operates to define the reference point, and in another one of the plurality of regions, the detected first input is associated with an event handler that does not operate to define the reference point.

In yet another aspect, the object is comprised in a webpage received by the electronic device, and the event handler associated with the detected first input is defined for the webpage.

In a further aspect, the first input and the second input are consecutive.

In another aspect, the first input also identifies the object for the rotation transformation.

There is also provided an electronic device, which may be in communication with an external display device, the electronic device being adapted to carry out any examples of the methods described herein. In particular, there is provided an electronic device, comprising: a plurality of user interface mechanisms; a processor in operative communication with the plurality of user interface mechanisms, the processor being capable of: detecting a first input at a first user interface mechanism of the plurality of user interface mechanisms, the first input defining a reference point for a displayed object; detecting, after commencement of the detected first input, a second input at a second user interface mechanism of the plurality of user interface mechanisms, the second user interface mechanism comprising a touchscreen display; and in response to the detected second input, applying a rotation transformation to the displayed object, a center of the rotation transformation being defined by the reference point, and an angle of the rotation transformation being defined by the second input.

In one example, the displayed object is displayed by the touchscreen display.

In another example, the displayed object is displayed by a display device in communication with the electronic device comprising the touchscreen display.

In one aspect, at least a portion of a duration of the second input overlaps a duration of the first input, and a final angle of the rotation transformation is determined by an angle of rotation computed from the detected second input at a point that is the earlier of: a detected end of the first input, and a detected end of the second input.

In still another aspect, the object is displayed in a first one of a plurality of regions displayed on the touchscreen display, and in the first region comprising the object, the detected first input is associated with an event handler that operates to define the reference point, and in another one of the plurality of regions, the detected first input is associated with an event handler that does not operate to define the reference point.

In a further aspect, the object is comprised in a webpage received by the electronic device, and the event handler associated with the detected first input is defined for the webpage.

In yet a further aspect of the electronic device, the first input and the second input are consecutive.

In still a further aspect, the first input also identifies the object for the rotation transformation.

There is also provided a program product comprising an electronic device-readable medium, which may be physical or non-transitory, bearing code which, when executed by a processor or processors of an electronic device, the electronic device comprising a plurality of user interface mechanisms, causes the electronic device to carry out the various examples of methods described herein, for example using the examples of electronic devices described herein.

In some examples of the foregoing method, device and program product, the first user interface mechanism is a pointing device; in others, the first user interface mechanism is one of a mouse, trackpad, trackball, and optical joystick. In still other examples, the first user interface mechanism is a simulated pointing device provided via the touchscreen display.

It should be understood that steps and the order of the steps in the processing described herein may be altered, modified and/or augmented and still achieve the desired outcome. Throughout the specification, terms such as "may" and "can" are used interchangeably and use of any particular term should not be construed as limiting the scope or requiring experimentation to implement the claimed subject matter or embodiments described herein.

The systems' and methods' data may be stored in one or more data stores. The data stores can be of many different types of storage devices and programming constructs, such as RAM, ROM, flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. Various functional units described herein have been expressly or implicitly described as modules and agents, in order to more particularly emphasize their independent implementation and operation. It is also noted that an agent, module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The various functional units may be implemented in hardware circuits such as custom VLSI circuits or gate arrays; field-programmable gate arrays; programmable array logic; programmable logic devices; commercially available logic chips, transistors, and other such components. Modules implemented as software for execution by a processor or processors may comprise one or more physical or logical blocks of code that may be organized as one or more of objects, procedures, or functions. The modules need not be physically located together, but may comprise code stored in different locations, such as over several memory devices, capable of being logically joined for execution. Modules may also be implemented as combinations of software and hardware, such as a processor operating on a set of operational data or instructions.

A portion of the disclosure of this patent document contains material which is or may be subject to one or more of copyright, design patent, industrial design, or unregistered design protection. The rights holder has no objection to the reproduction of any such material as portrayed herein through facsimile reproduction of the patent document or patent disclosure, as it appears in the Patent and Trademark Office patent file or records, but otherwise reserves all rights whatsoever.

The invention claimed is:

1. A method implemented at an electronic device, the method comprising:
    displaying an object on a touchscreen display of the electronic device;
    detecting a first input from a user interface mechanism of the electronic device other than the touchscreen display, the user interface mechanism comprising a pointing device, the first input comprising instructions moving a cursor to a position on the touchscreen display and selecting the position to define a reference point for the displayed object;
    detecting, after the reference point is defined, a second input at the touchscreen display; and
    in response to the detected second input, applying a rotation transformation to the displayed object, a center of the rotation transformation being defined by the reference point, and an angle of the rotation transformation being defined by the second input.

2. The method of claim 1, wherein the touchscreen display is comprised in the electronic device.

3. The method of claim 1, wherein the user interface mechanism is comprised in the electronic device.

4. The method of claim 1, wherein at least a portion of a duration of the second input overlaps a duration of the first input, and further wherein a final angle of the rotation transformation is determined by an angle of rotation computed from the detected second input at a point that is the earlier of: a detected end of the first input, and a detected end of the second input.

5. The method of claim 1, wherein the first input and the second input are concurrent, the method further comprising:
    detecting, after an end of the second input and while the first input continues, a third input at the touchscreen display; and
    in response to the detected third input, applying a further rotation transformation to the displayed object, a center of the further rotation transformation being defined by the reference point defined by the first input, and an angle of the further rotation transformation being defined by the third input.

6. The method of claim 1, wherein the object is comprised in a webpage received by the electronic device, and the detected first input is associated with an event handler that operates to define the reference point, the event handler being defined in the webpage.

7. The method of claim 1, wherein the first input and the second input are consecutive.

8. The method of claim 1, wherein the user interface mechanism is one of a mouse, trackball, and optical joystick.

9. The method of claim 1, wherein the first input also identifies the object for the rotation transformation.

10. An electronic device, comprising:
a touchscreen display;
a user interface mechanism other than the touchscreen display, the user interface mechanism comprising a pointing device;
a processor in operative communication with the touchscreen display and the user interface mechanism, the processor being configured to:
  detect a first input from the user interface mechanism, the first input comprising instructions moving a cursor to a position on the touchscreen display and selecting the position to define a reference point for an object displayed on the touchscreen display;
  detect, after the reference point is defined, a second input at the touchscreen display; and
  in response to the detected second input, apply a rotation transformation to the displayed object, a center of the rotation transformation being defined by the reference point, and an angle of the rotation transformation being defined by the second input.

11. The electronic device of claim 10, wherein at least a portion of a duration of the second input overlaps a duration of the first input, and further wherein a final angle of the rotation transformation is determined by an angle of rotation computed from the detected second input at a point that is the earlier of: a detected end of the first input, and a detected end of the second input.

12. The electronic device of claim 10, wherein the first input and the second input are concurrent, and the processor is further configured to:
  detect, after an end of the second input and while the first input continues, a third input at the touchscreen display; and
  in response to the detected third input, apply a further rotation transformation to the displayed object, a center of the further rotation transformation being defined by the reference point defined by the first input, and an angle of the further rotation transformation being defined by the third input.

13. The electronic device of claim 10, wherein the object is comprised in a webpage received by the electronic device, and the detected first input is associated with an event handler that operates to define the reference point, the event handler being defined in the webpage.

14. The electronic device of claim 10, wherein the first input and the second input are consecutive.

15. The electronic device of claim 10, wherein the user interface mechanism is one of a mouse, trackball, and optical joystick.

16. The electronic device of claim 10, wherein the first input also identifies the object for the rotation transformation.

17. A program product comprising a non-transitory electronic device-readable medium bearing code which, when executed by a processor or processors of an electronic device, causes the electronic device to carry out a method of:
  displaying an object on a touchscreen display of the electronic device;
  detecting a first input from a user interface mechanism of the electronic device other than the touchscreen display, the user interface mechanism comprising a pointing device, the first input comprising instructions moving a cursor to a position on the touchscreen display and selecting the position to define a reference point for the displayed object;
  detecting, after the reference point is defined, a second input at the touchscreen display; and
  in response to the detected second input, applying a rotation transformation to the displayed object, a center of the rotation transformation being defined by the reference point, and an angle of the rotation transformation being defined by the second input.

* * * * *